United States Patent
Dietz et al.

(10) Patent No.: US 6,774,502 B2
(45) Date of Patent: Aug. 10, 2004

(54) BATTERY POWERED LAPTOP COMPUTER WITH AN IMPLEMENTATION FOR CONVERTING KEYBOARD KEYSTROKE MOTION INTO CURRENT FOR AUXILIARY RECHARGING OF BATTERY

(75) Inventors: Timothy Alan Dietz, Austin, TX (US); Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 10/324,513

(22) Filed: Dec. 19, 2002

(65) Prior Publication Data

US 2004/0119290 A1 Jun. 24, 2004

(51) Int. Cl.[7] .................................................. H02J 7/00
(52) U.S. Cl. ........................ 290/1 R; 322/100; 320/107
(58) Field of Search ......................... 290/1 R; 322/100; 320/107, 4

(56) References Cited

U.S. PATENT DOCUMENTS 5,627,450 A * 5/1997 Ryan et al. .................. 361/686
5,630,155 A * 5/1997 Karaki et al. ................ 713/340
6,046,571 A * 4/2000 Bovio et al. ................. 320/113
6,489,745 B1 * 12/2002 Koreis .......................... 320/108
6,531,845 B2 * 3/2003 Kerai et al. ................... 320/107
6,639,790 B2 * 10/2003 Tsai et al. ..................... 361/683
6,668,296 B1 * 12/2003 Dougherty et al. .......... 710/303

* cited by examiner

*Primary Examiner*—Nicholas Ponomarenko
*Assistant Examiner*—Heba Elkassabgi
(74) *Attorney, Agent, or Firm*—Jerry Kraft; Mark E. McBurney

(57) ABSTRACT

A system for a battery powerable portable computer with keyboard input that extends the battery charge lifetime during time periods when the computer is being operated in a battery powered mode comprising the combination of a battery providing power to the computer, a keyboard providing input to the computer through user keystrokes, apparatus operatively associated with each of a set of keys in the keyboard for converting the mechanical motion respectively applied to each of the set of keys during keystrokes to generate an electrical current, and an electrical connector for applying the electrical current to charge said battery. The apparatus for converting the mechanical motion to generate an electrical current should include at least one electrical generator.

17 Claims, 3 Drawing Sheets

BATTERY POWERED LAPTOP COMPUTER WITH AN IMPLEMENTATION FOR CONVERTING KEYBOARD KEYSTROKE MOTION INTO CURRENT FOR AUXILIARY RECHARGING OF BATTERY

TECHNICAL FIELD

The present invention relates to portable battery powered personal computers such as laptop computers, and particularly to maximizing the charge on the battery, and consequently the period of time that the computer can be used on battery power.

BACKGROUND OF RELATED ART

Since their commercial introduction in the mid 1980's, battery powered personal computers, particularly laptop computers, have sold in the hundreds of millions and have become an industry staple. The human factors, i.e. ease of use of such laptops, e.g. size, weight, clarity and size of display and response time have continually been improved to point that it appears as if virtually everyone who regularly uses computers is carrying a laptop around.

The one property of laptop computers that has trailed the other properties in improvement has been the period of time that the computer can be used under battery power that is directly related to ability to apply a recharge to the battery and the ability of the battery to retain a charge. It appears that the charge retentive time period that a laptop may be battery powered in use has been about two and at most four hours. This is too short for many airplane trips for example. The result has been the now classic example of dozens of business people or students trailing about in transportation terminals, public buildings and restaurants carrying along the one pound AC adapter and looking for an AC plug-in for their laptops. This, of course, makes the laptops a little less portable and convenient to use.

SUMMARY OF THE PRESENT INVENTION

While the present invention does not eliminate AC adapter plug-in carrying or the need to recharge the portable computer battery, it offers an implementation that should extend the battery chargeablity and, consequently, the period of time on battery operation by about 25%. The present invention provides a system for a battery powerable portable computer with keyboard input that extends the battery charge lifetime during time periods when the computer is being operated in a battery powered mode comprising the combination of a battery providing power to the computer, a keyboard providing input to the computer through user keystrokes, apparatus operatively associated with each of a set of keys in the keyboard for converting the mechanical motion respectively applied to each of said set of keys during keystrokes to generate an electrical current, and an electrical connector for applying said electrical current to charge said battery. The apparatus for converting the mechanical motion to generate an electrical current should include at least one electrical generator.

In one desirable embodiment, this converting apparatus includes a set of electrical generators, each respectively associated with a corresponding one of said keys. In one application of this embodiment, each of the set of corresponding keys includes a magnetic key shaft movable during a keystroke; and the system further includes a plurality of conductive coils, each coil encircling a respective one of the magnetic key shafts whereby each magnetic shaft and encircling coil provides one of the set of electrical generators. In this connection, the set of keys with such associated current generation need not be all of the keys on the keyboard; a set of the most frequently used keys, such as most of the vowels and "d, t, r, s" may provide sufficient supplemental current for charging.

Also, piezoelectrical devices may be associated with each of a set of keys to convert the keystroke motions into electrical current.

In accordance with another embodiment of this invention, a single generator may be used. It would preferably be a small turbo-generator driven pneumatically or hydraulically by a fluid: gas or liquid cumulative stream driven by the cumulative motion of all of the set of keys. In one such embodiment, each of the set of keys includes a shaft piston movable during a keystroke to pneumatically drive a gas stream; and further includes a pneumatically driven turbo-generator and a conduit for pneumatically conducting the gas streams from each of the set of keys to drive said turbo-generator, whereby the electrical current is generated. In a similar embodiment, each of the set of keys includes a shaft piston movable during a keystroke to hydraulically drive a gas stream; and further includes a hydraulically driven turbo-generator, and a conduit for hydraulically conducting the gas streams from each of the set of keys to drive said turbo-generator whereby the electrical current is generated.

Also, with such fluid stream driven generators, the set of keys with such associated fluid driving pistons need not be all of the keys on the keyboard; a set of the most frequently used keys, such as most of the vowels and "d, t, r, s" may provide a sufficient stream of fluids to drive the turbo-generator to provide the current for charging.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
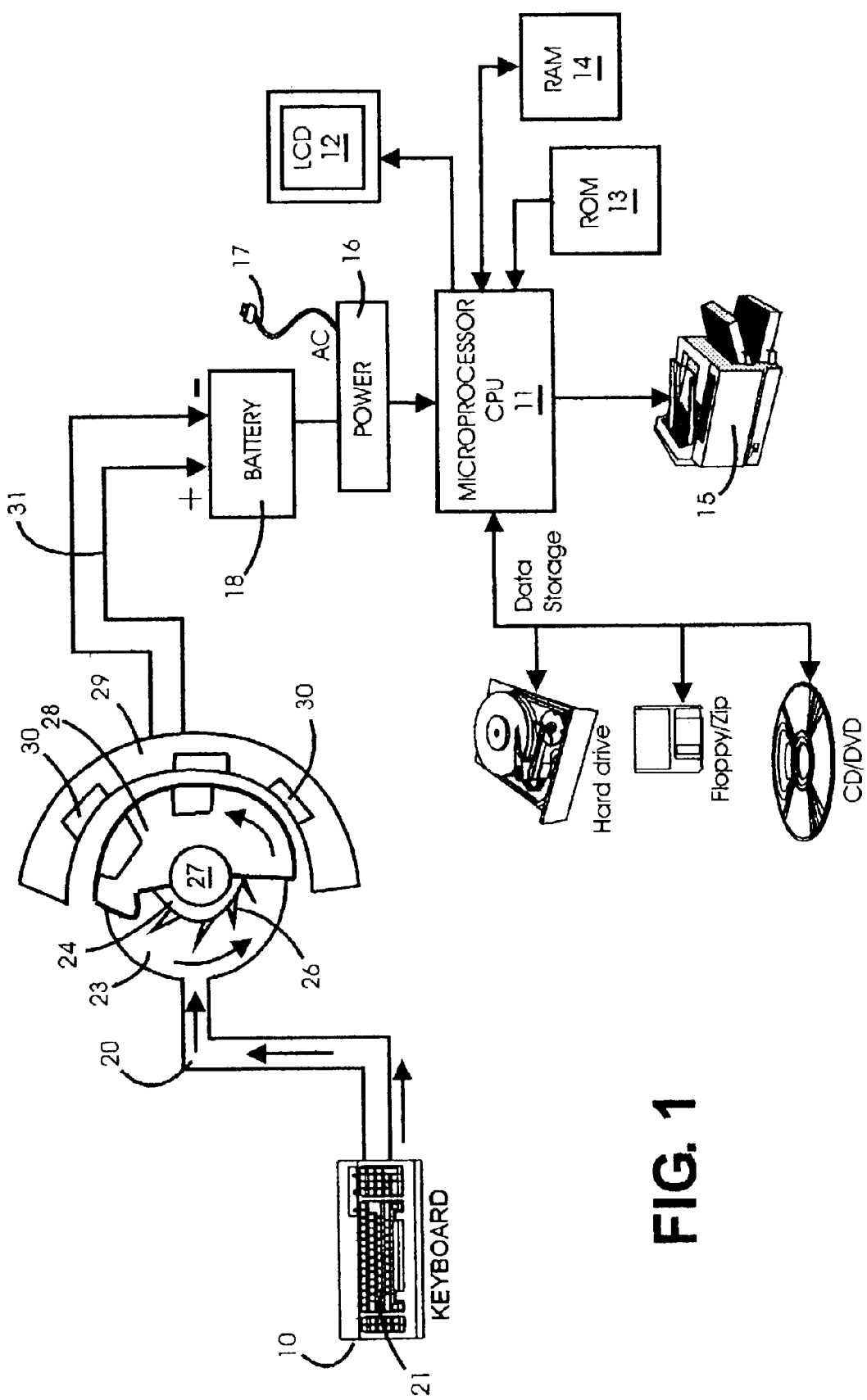
FIG. 1 is a generalized diagrammatic view showing how the fluid driven turbo-generator embodiment of a laptop computer of this invention may be used to provide the auxiliary battery charge during battery powering.

Referring to FIG. 1, there is diagrammatically shown a in schematic form, a typical laptop computer available from International Business Machines corporation (IBM) or Dell Corporation modified to accommodate the present invention. The laptop is powered by a microprocessor 11 that controls all of its functions via an operating system, e.g. Windows98™. The laptop has memory, both Read only Memory (ROM) 13 and Random Access Memory (RAM) 14. The RAM stores the data files and application software while the computer is on. The ROM chip includes the system BIOS. The data storage for the laptop is provided by a hard drive or disk drive, as well as through CD/DVD, as well as floppy disks or the larger capacity Zip disk inputs. The CPU controls outputs to suitable printers 15, as well as to the Liquid Crystal Display (LCD) 12. The CPU controls power management applications 16 to control, AC plug supplies 17, batteries 18, as well as the battery recharging.

Figure 2:
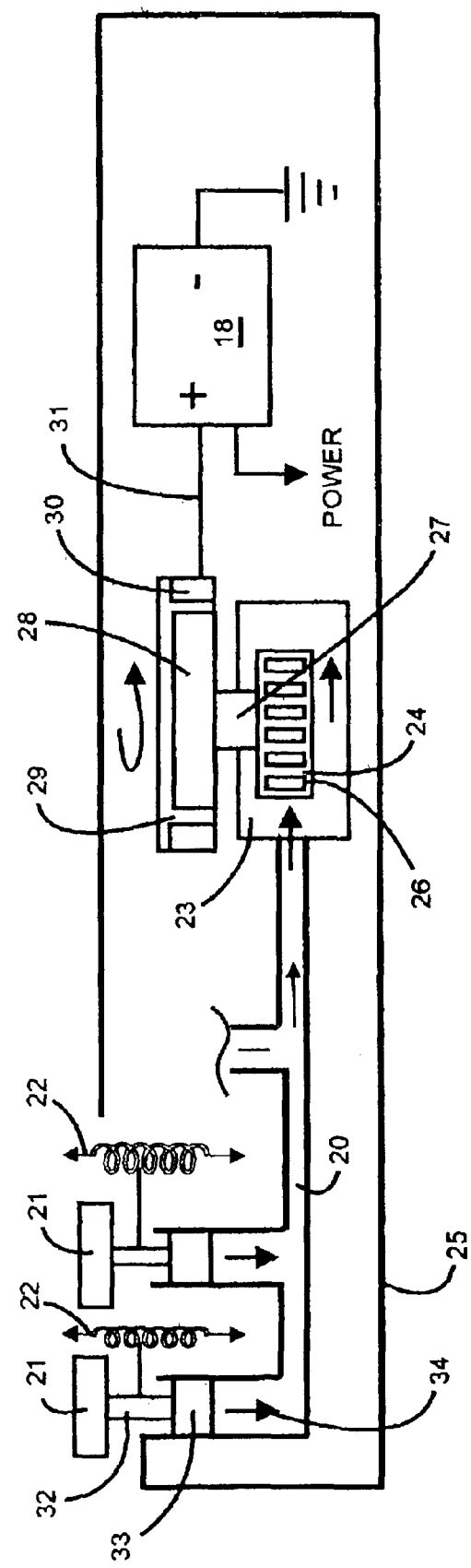
FIG. 2 is a diagrammatic side view of the fluid driven turbo-generator embodiment portion of the laptop computer of FIG. 1.

There will now be described a pneumatically driven recharging operation with respect to FIGS. 1 and 2. Keyboard 10 has the conventional keys 21. However, a set of these keys are modified as shown in FIG. 2 to provide the pneumatic drive. The set need not be all of the keys in the keyboard, but it should include a number of frequently struck keys sufficient to pneumatically drive the turbogenerator to produce current needed to extend the battery charge during the battery powered operations. The keys 21 are biased to their initial positions by springs 22. When a key is struck, key shaft 32 drives piston 33 to drive the pneumatic gas, e.g. air in the direction 34 shown. The collective air stream from all of the, thus, fitted key pistons is driven as keys are struck in the direction shown in collective conduit 20 into enclosed pneumatic chamber 23 wherein the pneumatic stream impinges upon curved blades on rotor wheel 24 in the direction shown in FIG. 1. This in turn rotates shaft 27 to thereby rotate the hydro-generator rotor 28 affixed to the shaft. As windings in rotor 28 are rotated past the windings 30 in stator 29, the electrical current is generated that is applied via connector 31 to charge battery 18.

The resulting structure shown is a miniaturized turbo-generator that is comparable in size to the standard disk drives mounted in laptop computers and may be fabricated by the same technology. Rotor 29 acts as a flywheel providing the inertia to continue to rotate during uneven keystroke input. It is similar to a disk drive platter, and may be mounted in approximately the same space.

It will be understood that the fluid drive turbo-generator embodiment of FIGS. 1 and 2 could be modified to use a hydraulic fluid, i.e. liquid in place of the pneumatic drive of FIG. 1. The functional elements including the turbogenerator would operate in the same manner.

Figure 3:
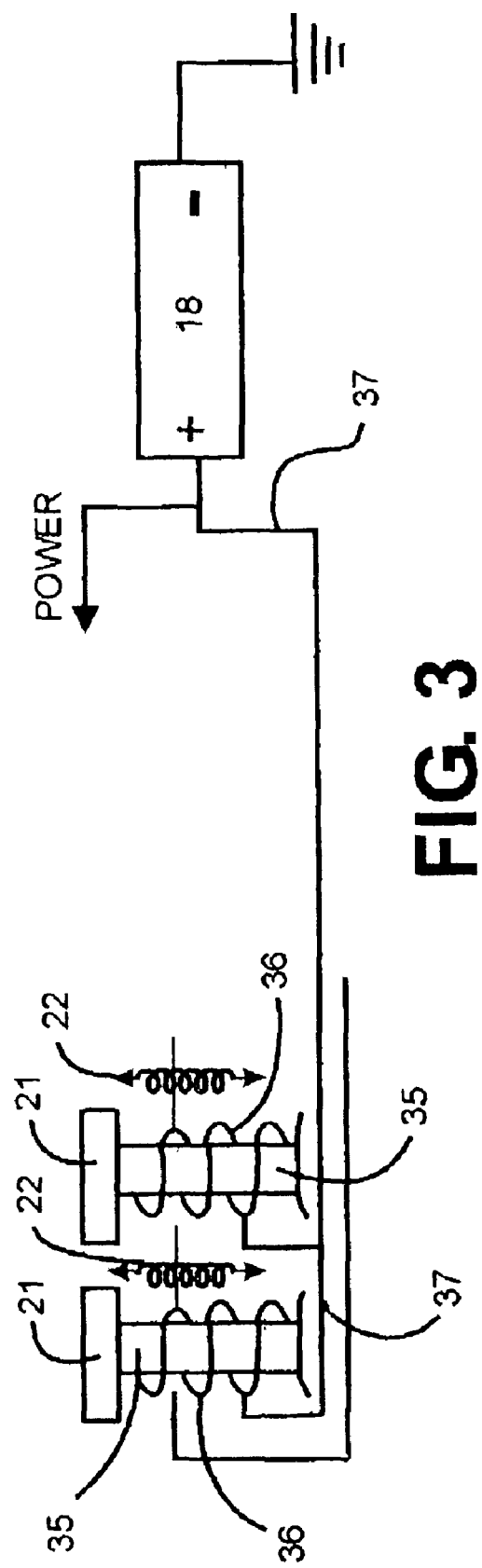
FIG. 3 is a diagrammatic side view like that of FIG. 2 but of the alternative individual key coil and magnetic shaft generator embodiment portion of the laptop computer of this invention.

Another simple embodiment will be described with respect to FIG. 3. This in effect uses a set of keys that may be all of the keys in the keyboard or at least a set of a lessor number of the keys that are the most frequently used keys. The keys 21 are biased to their initial positions by springs 22. The key shafts 32 are magnets. Thus, when they pass through surrounding conductive coils 36, they in effect act as individual generators producing electrical currents that are combined into connector 37 and, thus, applied to charge battery 18.

Although certain preferred embodiments have been shown and described, it will be understood that many changes and modifications may be made therein without departing from the scope and intent of the appended claims.

What is claimed is:

1. In a battery powerable portable computer with keyboard input, a system for extending the battery charge lifetime during time periods when the computer is being operated in a battery powered mode comprising:
   a battery providing power to the computer;
   a keyboard providing input to the computer through user keystrokes;
   apparatus operatively associated with each of a set of keys in the keyboard for converting the mechanical motion respectively applied to each of said set of keys during keystrokes to generate an electrical current; and
   an electrical connector for applying said electrical current to charge said battery.

2. The battery powerable portable computer of claim 1 wherein said apparatus for converting said mechanical motion to generate an electrical current includes at least one electrical generator.

3. The battery powerable portable computer of claim 2 wherein said apparatus for converting said mechanical motion to generate an electrical current includes a set of electrical generators, each respectively associated with a corresponding one of said keys.

4. The battery powerable portable computer of claim 3 wherein:
   each of said set of corresponding keys includes a magnetic key shaft movable during a keystroke; and
   further including a plurality of conductive coils, each coil encircling a respective one of said magnetic key shafts whereby each magnetic shaft and encircling coil provides one of said set of electrical generators.

5. The battery powerable portable computer of claim 4 wherein each of said set of electrical generators is connected to said electrical connector whereby the collective current from said set of generators is applied to charge said battery.

6. The battery powerable portable computer of claim 5 wherein said set of electric generators are associated with a set of corresponding keys most frequently keystroked but less than all of the keys in the keyboard.

7. The battery powerable portable computer of claim 1 wherein said apparatus for converting said mechanical motion to generate an electrical current includes a pneumatically driven electrical generator.

8. The battery powerable portable computer of claim 7 wherein:
   each of said set of keys includes a shaft piston movable during a keystroke to pneumatically drive a gas stream; and
   further including:
   a pneumatically driven turbo-generator; and
   a conduit for pneumatically conducting the gas streams from each of said set of keys to drive said turbo-generator whereby said electrical current is generated.

9. The battery powerable portable computer of claim 8 wherein said gas is air.

10. The battery powerable portable computer of claim 8 wherein said set of keys are the most frequently keystroked but less than all of the keys in the keyboard.

11. The battery powerable portable computer of claim 1 wherein said apparatus for converting said mechanical motion to generate an electrical current includes a hydraulically driven electrical generator.

12. The battery powerable portable computer of claim 11 wherein:
   each of said set of keys includes a shaft piston movable during a keystroke to hydraulically drive a liquid stream; and
   further including:
   a hydraulically driven turbo-generator; and
   a conduit for hydraulically conducting said liquid streams from each of said set of keys to drive said turbo-generator whereby said electrical current is generated.

13. A method for extending the battery charge lifetime in a battery powerable portable computer with keyboard input, during time periods when the computer is being operated in a battery powered mode comprising:

during user keystroke input to the computer through the keyboard, converting the mechanical motion respectively applied to each of said set of keys during said keystrokes to generate an electrical current increment representative of the motion of each of said set of keys;

combining the current increments to generate a combined electrical current; and applying said combined electrical current through a conductive electrical connection to charge said battery.

14. The method of claim 13 wherein said mechanical motion applied respectively to each of said set of keys during keystrokes is converted through the steps of:

forming the key shafts of each of said set of keys of magnetic materials; and encircling each of the set of magnetic key shafts with conductive electrical coils whereby the motion of the respective key shafts through said encircling coil generates a current.

15. The method of claim 14 wherein said set of keys are the most frequently keystroked but less than all of the keys in the keyboard.

16. The method of claim 13 wherein said conversion of said mechanical motion applied to each set of keys to said combined electrical current comprises the steps of:

converting said mechanical motion into a pneumatic stream, and generating an electrical current from said pneumatic stream.

17. The method of claim 13 wherein said conversion of said mechanical motion applied to each set of keys to said combined electrical current comprises the steps of:

converting said mechanical motion into a hydraulic stream, and generating an electrical current from said hydraulic stream.

* * * * *